United States Patent [19]

Takahashi

[11] E Re. 29,171

[45] Reissued Apr. 5, 1977

[54] MULTI-DIRECTIONAL SOUND SYSTEM

[75] Inventor: Susumu Takahashi, Tokyo, Japan

[73] Assignee: Sansui Electric Co., Ltd., Tokyo, Japan

[22] Filed: Dec. 20, 1974

[21] Appl. No.: 534,850

Related U.S. Patent Documents

Reissue of:

[64] Patent No.: 3,777,076
Issued: Dec. 4, 1973
Appl. No.: 268,726
Filed: July 3, 1972

[30] Foreign Application Priority Data

July 2, 1971 Japan ..... 46-48674

[52] U.S. Cl. ..... 179/100.4 ST; 179/1 GQ
[51] Int. Cl.[2] ..... G11B 3/74
[58] Field of Search ..... 179/100.4 ST, 100.4 C, 179/100.1 TD, 1 G, 1 GQ, 15 BT

[56] References Cited

UNITED STATES PATENTS

| | | | |
|---|---|---|---|
| 3,745,252 | 7/1973 | Bauer | 179/1 GQ |
| 3,856,992 | 12/1974 | Cooper | 179/1 GQ |

OTHER PUBLICATIONS

Scheiber, Analysing Phase-Amplitude Matrices, Preprint No. 815 (J-5), Oct. 71.

*Primary Examiner*—Raymond F. Cardillo, Jr.
*Attorney, Agent, or Firm*—Harris, Kern, Wallen & Tinsley

[57] ABSTRACT

A multi-directional sound system for use in the manufacture of matrix four channel stereophono discs comprises an encoder including a plurality of phase shifters for shifting the phases of a plurality of directional input signals from discrete sound sources by angles corresponding to the directions of the sound sources and a matrix circuit for producing two channel signals, and a decoder for decoding the two channel signals for reproducing the directional input signals.

7 Claims, 9 Drawing Figures

MULTI-DIRECTIONAL SOUND SYSTEM

Matter enclosed in heavy brackets [ ] appears in the original patent but forms no part of this reissue specification; matter printed in italics indicates the additions made by reissue.

This invention relates to a multi-directional sound system for encoding multi-channel sound signals into two channel signals and then decoding the two channel signals back into the multi-channel sound signals.

Matrix four channel stereo record systems have been developed which use a two-channel transmission system for the purpose of reproducing sounds from a two-channel stereo-phono disc with an enhanced sensation of presence. In each prior system, however, it is not possible to perfectly decoded two channel signals into four channel signals.

In preparation of a matrix 4-channel stereo disc, the front-left and front-right sounds in a sound field are recorded on the disc by the horizontal movement of a sound groove cutter receiving two channel left signals L and right signals R, and the rear-right and rear-left sounds by the vertical movement of the cutter. Since a two-channel transmission system or disc is used, cross-talks inevitably occur between the channels. However, the reproduced sounds are separated into respective channels and are heard as if they come from four discrete directions by the sense of listeners.

It is an object of this invention to provide an improved encoding system capable of converting directional multi-channel signals into two channel signals without an appreciable cross-talk.

Another object of this invention is to provide an improved decoding system for use in combination with the encoding system.

According to one aspect of this invention there is provided an encoding system for forming two channel signals in accordance with input signals from a plurality of directive sound sources, which comprises a plurality of input terminals connected to receive the input signals respectively; two output terminals; a plurality of phase shifters connected to the input terminals, each phase shifter acting to shift the electrical phase of the input signal from each sound source by an angle corresponding to an angle equal to one half of the positional angle of the sound source; means connected between the output sides of respective phase shifters and a first output terminal for multiplying the output of each phase shifter with a sine of an angle equal to one half of the positional angle of a corresponding sound source; and means connected between the output sides of respective phase shifters and a second output terminal for multiplying the output of each phase shifter with a cosine of an angle to one half of the positional angle of a corresponding sound source.

According to another aspect of the invention there is provided a decoder system for producing reproduced outputs corresponding to the input signals from the sound sources from the two channel signals formed by the encoding system described above, said decoder system comprising a pair of input terminals connected to receive the two channel signals; output terminals of the same number as the sound sources; first means connected between the first input terminal and respective output terminals for multiplying the first input signal applied to the first input terminal with a sine of an angle equal to one half of the positional angle of a corresponding sound source; second means connected between the second input terminal and respective output terminals for multiplying the second input signal applied to the second input terminal with a cosine of an angle equal to one half of the positional angle of a corresponding sound source; and phase shifters connected between the first and second means and the output terminals for compensating for the phase shift provided by said encoder.

In accordance with further aspect of this invention there is provided a multi-directional sound system comprising a combination of the encoder and decoder described above.

The present invention can be more fully understood from the following detailed description when taken in connected with reference to the accompanying drawings, in which.

To aid better understanding of the invention, one example of a four channel recording system will first be described.

Figure 1:
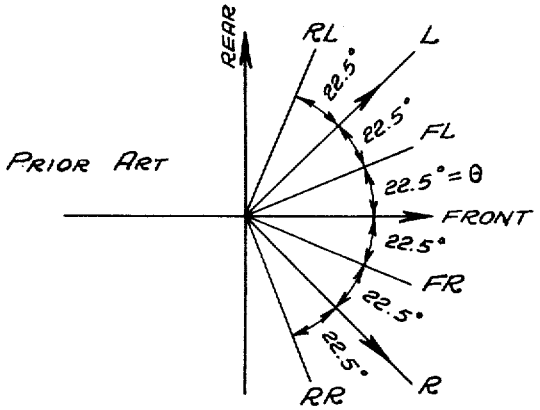
FIG. 1 is a graph showing a vector diagram for cutting a matrix four channel stereo record.
Figure 2:
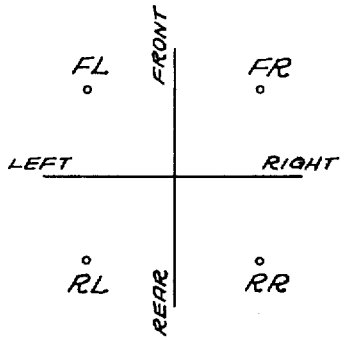
FIG. 2 is a diagram showing a square sound field.

FIG. 1 shows cutting vectors which are utilized for cutting four channel signals FR (front right), FL (front left), RL (rear left) and RR (rear right) obtained from a square sound field shown in FIG. 2 on a two channel stereo disc. Cutting vectors L and R of the conventional stereo signals intersect at right angles and these vectors are on the opposite sides of the horizontal or front axis. Signals RL and FL on the left hand side of the sound field and signals FR and RR on the right hand side of the sound field are recorded with a cutting angle of 22.5° with respect to signals L and R respectively. Each signal vector has an angle of directivity equal to an integer multiple of a cutting angle or matrix angle of 22.5° measured from the front axis. Since vectors of signals FL and RR and vectors of signals RL and FR intersect with each other at right angles respectively, there is no appreciable cross-talk between channels which are on diagonals of the reproduced sound field. The expression "cutting angle" as used herein refers to the direction of motion of the cutter stylus, and not to the angle of the tip of the cutter.

However, as can be clearly noted from these cutting vectors, when the sound source is positioned at the rear center of the sound field, or where signals RR and RL have equal magnitude and frequency the resultant vector of these signals will be in the direction of the horizontal axis so that the sound in the rearward direction of the sound field will be recorded as the sound in the forward direction.

Figure 3:
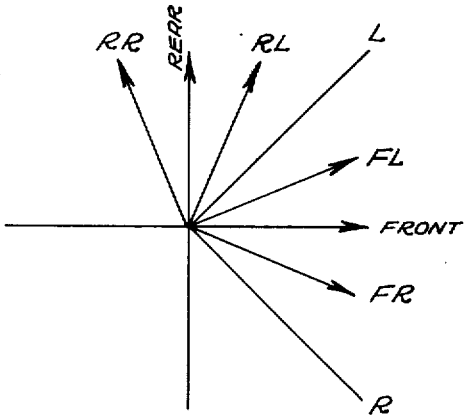
FIG. 3 is a graph showing another example of a vector diagram for cutting a matrix four channel stereo record.

To obviate this defect, a cutting method as shown in FIG. 3 has been proposed. Accordingly to this method the resultant vector of signals RL and RR is directed in the direction of the vertical or rear axis so that above described defect can be eliminated. This method, however, is not advantageous in that when four channel signals have the same magnitude and frequency, the resultant vector will always be in the single direction, that is the direction of vector L.

Figure 4:
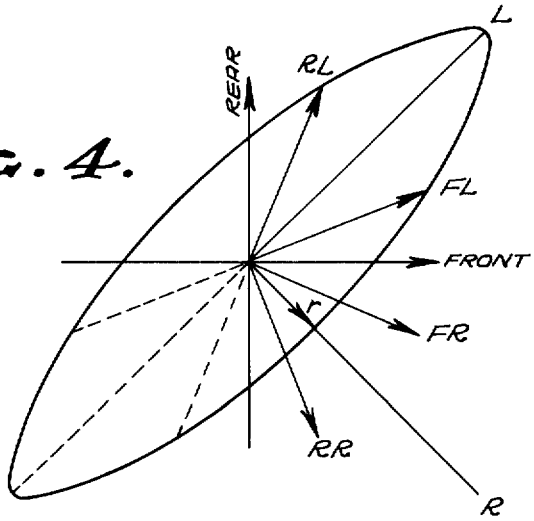
FIG. 4 is a cutting vector diagram useful to explain the cross-talk which occurs when manufacturing a conventional matrix four channel record.

In order to obviate this difficulty, a third method has been proposed according to which the phase of the signal RL utilized in the first method is shifted by 90° to produce a signal jRL and the phase of signal RR is shifted by −90° to form a signal −jRR. According to this third method the composite vector of signals RL and RR cuts the disc in the vertical direction, whereas the composite vector of signals FL and FR, cuts in the horizontal direction. For this reason, even when four channel signals have the same magnitude and frequency the resultant vector depicts a circle so that these signals are not recorded as a sound in a single direction as in the second method. According to the third method, however, the sounds in the direction of L in the sound field, that is the sounds producing the signals FL and RL produce a cross-talk component in the direction R. When signals FL and RL are identical with each other and signals FR and RR are zero the resultant vector of signals RL and FL will depict an ellipse as shown in FIG. 4 since the signals FL and RL are different in phase by 90°. This means that the sound groove cutter is moved along an ellipse even though there is no signal of the right component. As a result, the elliptical movement of the sound groove cutter produces a cross-talk in the direction R.

Let us now consider the degree of separation between signals L and R at the time of cutting.

The resultant signals L and R are expressed by the following equations:

$$L = \cos 22.5° \cdot FL + j \cos 22.5° \cdot RL + \sin 22.5° \cdot FR - (-j) \sin 22.5° \cdot RR$$

$$R = \sin 22.5° \cdot FL - j \sin 22.5° \cdot RL + \cos 22.5° \cdot FR + (-j) \cos 22.5° \cdot RR$$

Assuming now that signals FR and RR equal zero and signals FL and RL are expressed by sin pt, the resultant signals L and R are given by the following equation:

$$L = 0.92 (\sin pt + \cos pt) = 0.92 \sqrt{2} \sin (pt + 45°) = 1.3 \sin (pt + 45°) \; R = 0.38 (\sin pt - \cos pt) = 0.38 \sqrt{2} \sin (pt - 45°) = 0.535 \sin (pt - 45°)$$

Accordingly, the degree of separation is given by $$r = L/R = 2.42 = 7.7 \text{ db.}$$

When a cutting is made with two channel signals produced by the encoding system it is possible to improve the degree of separation between signals L and R.

According to this invention, four channel signals FL, RL, FR and RR obtained from the square sound field are utilized to produce two channel signals L and R expressed by the following equations:

$$L = \cos\theta \cdot FL < \theta + \cos\theta \cdot RL < 3\theta + \sin\theta \cdot FR < -\theta - \sin\theta \cdot RR < -3\theta \quad (1)$$

$$R = \sin\theta \cdot FL < \theta - \sin\theta \cdot RL < 3\theta + \cos\theta \cdot FR < -\theta + \cos\theta \cdot RR < -3\theta \quad (2)$$

where $\theta$ represents the cutting angle of 22.5° shown in FIG. 1 and FL $< \theta$ means that the phase angle of signals FL is shifted by $\theta$ electrical degrees. The angle $\theta$ is positive when it is measured in the counterclockwise direction from the front axis shown in FIG. 1. Resultant signals L and R are applied to a conventional stereo sound groove cutter to cut the walls of the sound groove of a disc which intersect with each other at right angle.

As clearly shown in the equations (1) and (2), the four channel signals FL, RL, FR and RR are phase shifted by electrical angles which are equal to respective cutting angles. Accordingly, in this case, if signals FL and RL are the same (sin pt) and signals FR and RR are equal to zero, above described equations for L and R are rewritten as follows:

$$L = 0.92 \sin (pt + \theta) + 0.92 \sin (pt + 3\theta) = 0.92[\sin (pt + 2\theta) \cos\theta - \cos (pt + 2\theta) \sin\theta + \sin (pt + 2\theta) \cos\theta + \cos (pt + 2\theta) \sin\theta] = 0.92 \times 2 \cos\theta \sin (pt + 2\theta) = 1.7 \sin (pt + 2\theta)$$

$$R = 0.38 \sin (pt + \theta) - 0.38 \sin (pt + 3\theta) = 0.38 [\sin (pt + \theta) \cos\theta - \cos (pt + 2\theta) \sin\theta - \sin (pt + 2\theta) \cos\theta - \cos (pt + 2\theta) \sin\theta] = -0.38 \times 2 \sin\theta \cos (pt + 2\theta) = -0.29 \cos (pt + 2\theta) = 0.29 \cos (pt - 2\theta)$$

Figure 5:
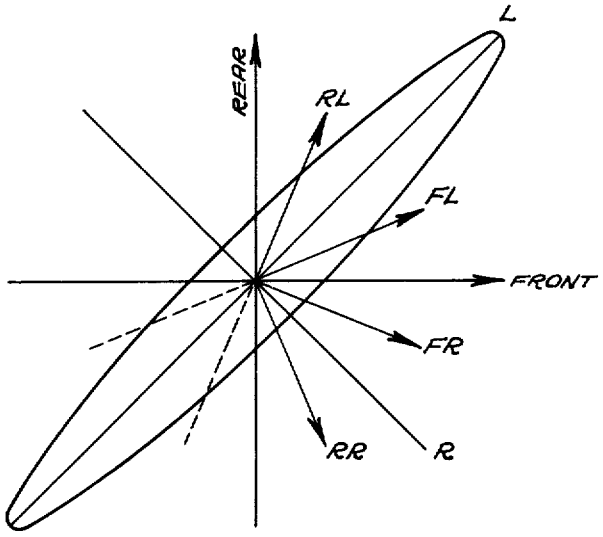
FIG. 5 shows a cutting vector diagram useful to explain the cross-talk which occurs when manufacturing a matrix four channel stereo record in accordance with this invention.

Thus, L/R −5.9 = 15.4 db and the cross-talk characteristic is greatly improved. In this case, the resultant vector of signals FL and RL depicts an ellipse as shown in FIG. 5.

Figure 6:
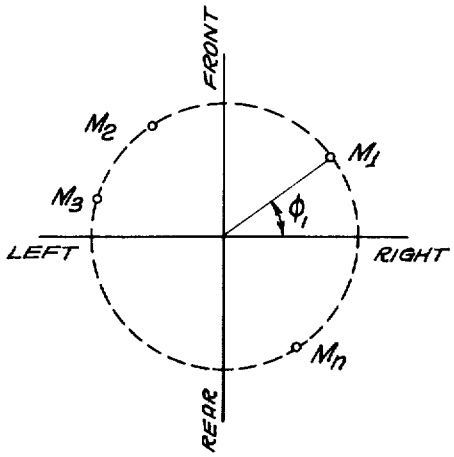
FIG. 6 is a diagram showing multi-directional sound fields.

Above described equations (1) and (2) are obtained from the square sound field shown in FIG. 2. The equation for encoding a plurality of directional input signals from a multi-directional sound field shown in FIG. 6 is as follows:

$$\begin{bmatrix} L \\ R \end{bmatrix} = \begin{bmatrix} e^{j\left(\frac{\phi_1}{2} - \frac{\pi}{4}\right)} \sin \frac{\phi_1}{2} & \cdots & e^{j\left(\frac{\phi_n}{2} - \frac{\pi}{4}\right)} \sin \frac{\phi_n}{2} \\ e^{j\left(\frac{\phi_1}{2} - \frac{\pi}{4}\right)} \cos \frac{\phi_1}{2} & \cdots & e^{j\left(\frac{\phi_n}{2} - \frac{\pi}{4}\right)} \cos \frac{\phi_n}{2} \end{bmatrix} \cdot \begin{bmatrix} E_1 \\ \vdots \\ E_n \end{bmatrix} \quad (3)$$

where $\phi_1$ represents the angle indicating the position of a sound source $M_1$, that is the positional angle of a microphone or sound source $M_1$ shown in FIG. 6 as measured from the abscissa in the counterclockwise direction and $E_1$ the magnitude of the voltage produced by this microphone. The term e shows the angle of phase shift of signal E.

Equations (1) and (2) are obtained by putting $\phi 2/=\pi/4+\theta$ in equation (3). Although equations (1) and (2) are expressed in terms of the cutting angle they can be expressed in terms of the positioned angle of the sound source. As evident from the equation (3), the signal L is obtained by multiplying the magnitudes of respective signals with a sine of an angle equal to one half of the positional angle of the signal source, shifting the electrical angles of the resulting signals by an angle corresponding to one half of the positional angle and adding the phase shifted signals whereas the signal R is obtained by multiplying the magnitudes of respective signals with a cosine of an angle equal to one half of the positional angle of the signal source, shifting the electrical angles of the resulting signals by an angle corresponding to one half of the positional angle and adding the phase shifted signals.

Four channel signals FL', FR', RL' and RR' from a disc on which the two channel signals L and R shown by equations (1) and (2) have been recorded are decoded in the following manner by means of a decoder.

$$FL' = (\cos\theta \cdot L + \sin\theta \cdot R) < -\theta = 0.85 \cdot FL + 0.85 \cdot RL < 2\theta + 0.35 \cdot FR < -2\theta - 0.35 \cdot RR < -4\theta + 0.15 \cdot FL - 0.15 \cdot RL < 2\theta + 0.35 \cdot FR < -2\theta + 0.35 \cdot RR < -4\theta = FL + 0.7 \cdot RL < 2\theta + 0.7 \cdot FR < -2\theta \; FR' = (\sin\theta \cdot L + \cos\theta \cdot R) < \theta = 0.7 \cdot FL < 2\theta + FR + 0.7\, RR < -2\theta \; RL' = (\cos\theta \cdot L - \sin\theta \cdot R) < -3\theta = 0.7 \cdot FL < -2\theta + RL + 0.7 \cdot RR < 2\theta$$

$$RR' = (-\sin\theta \cdot L + \cos\theta \cdot R) < 3\theta = 0.7 \cdot RL < -2\theta + 0.7 \cdot FR < 2\theta + RR$$

The signals decoded in this manner are respectively applied to loudspeakers on the left hand side in the forward direction, on the left hand side in the rearward direction, on the right hand side in the forward direction and on the right hand side in the rearward direction in the reproducing field thereby producing four channel stereo sounds.

Figure 7:
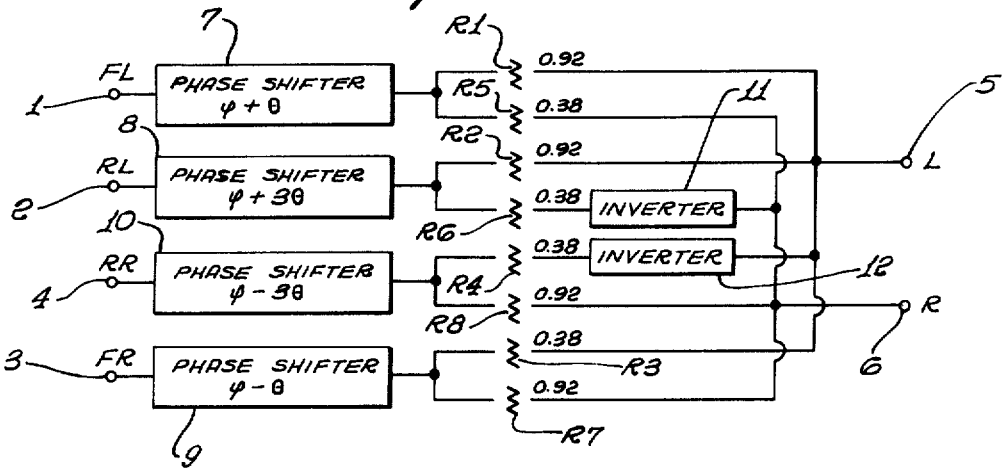
FIG. 7 shows a connection diagram of one example of the encoder embodying the invention.

FIG. 7 shows one example of the encoder constructed in accordance with this invention. In this figure, reference numerals 1, 2, 3 and 4 show input terminals of the encoder which are connected to receive four channel signals FL, RL, FR and RR, and reference numerals 7, 8, 9 and 10 show phase shifters connected to corresponding input terminals, the phase shifter 7 shifts the phase of signal FL by the cutting angle $\theta$(22.5°), or an angle obtained by subtracting 45° from one half of the positional angle of the sound source (135°, in this case), that is 22.5°. A symbol $\phi$ depicted in the blocks represents a reference angular quantity which is introduced for providing easy phase shift operation of the audio signals and may be considered to be equal to zero degree in operation. The output from the phase shifter 7 is multiplied with a cosine of the cutting angle $\theta$ by means of a resistor means or potentiometer $R_1$ and thence supplied to an output terminal 5 adapted for the signal L. Cos$\theta$ is equal to the sine of the angle of one half of the positional angle of the FL sound source (135°), that is sin67.5°. In other words, the resistor means $R_1$ multiplies the output from phase shifter 7 with a sine of the angle equal to one half of the positional angle of the FL sound source. Further, the output from phase shifter 7 is multiplied with the sine of the cutting angle $\theta$ by means of a resistor means $R_5$ and is then applied to an output terminal 6 adapted for the signal R. The resistor means $R_5$ may be considered to multiply the output from the phase shifter 7 by a cosine of an angle equal to one half of the positional angle of the FL sound source.

The phase shifter 8 functions to shift the phase of signal RL by 3$\theta$ degrees (67.5°) which is equal to the difference between one half of the positional angle 22.5° of the sound source RL and 45°. The output from phase shifter 8 is multiplied with cos$\theta$ (cos22.5° = 0.92) by means of a resistor means $R_2$ and then is applied to the output terminal 5, where cos$\theta$ is equal to the sine of one half of the positional angle 22.5° of the sound source RL (sin112.5° = 0.92). The output from phase shifter 8 is multiplied with sin$\theta$ by means of a resistor means $R_6$ and is then applied to the output terminal 6 through a phase inverter 11. The function of resistor means $R_6$ and inverter 11 is equivalent to multiply the output from phase shifter 8 with the cosine of an angle equal one half of the positional angle 225° of the RL sound source (cos112.5° = 0.38).

In this manner, the output terminal 5 is supplied with a sum of signals obtained by multiplying signals which are phase shifted by an electrical angle equal to the difference between an angle equal to one half of the positional angles of the sound source and 45°, with the sine of an angle to one half of the positional angles of the sound sources, whereas the output terminal 6 is supplied with a sum of the signals obtained by multiplying signals which are shifted by an electrical angle equal to the difference between an angle equal to one half of the positional angles of the sound sources and 45°, with the cosine of an angle equal to one half of the positional angles of the sound sources.

Figure 8:
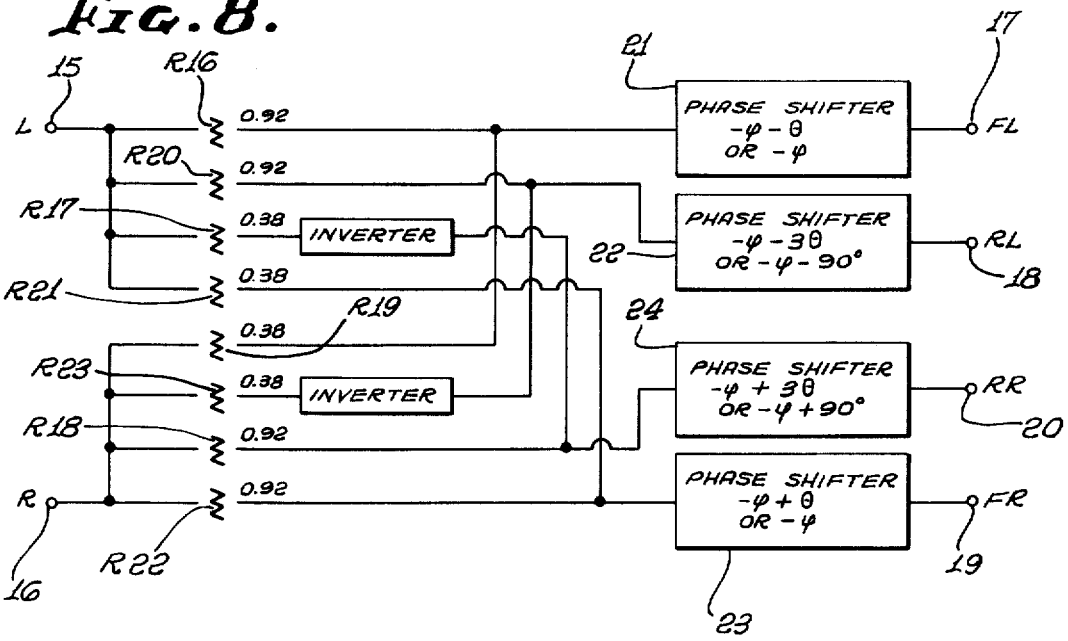
FIG. 8 shows a connection diagram of a decoder constructed in accordance with the invention.

The decoder will now be described with reference to FIG. 8. The signal L supplied to an input terminal 15 of the decoder is multiplied with cos$\theta$ by means of a resistor means $R_{16}$. The signal R applied to input terminal 16 is multiplied with sin$\theta$ by means of a resistor means $R_{19}$ and the outputs from the resistor means $R_{16}$ and $R_{19}$ are mixed with each other. The phase of the mixed signals is shifted by $-\theta$ by the action of phase shifter 21 thus supplying to output terminal 17 a reproduced signal FL' corresponding to signal FL. The resistor means $R_{16}$ operates to multiply the signal L with the sine of an angle equal to one half of the positional angle 135° of FL signal source for the purpose of producing reproduced signal FL', whereas the resistor means $R_{19}$ multiplies the signal R with the cosine of an angle equal to one half of the positional angle of FL signal source. Accordingly, another reproduced output can be obtained by forming a mixed signal consisting of a signal which is produced by multiplying the signal L with the sine of an angle equal to one half of the positional angle of the corresponding sound source and a signal which is produced by multiplying the signal R with the cosine of an angle equal to one half of the positional angle of the corresponding sound signal, and shifting the phase of the mixed signal in the opposite direction by an angle equal to the angle of phase shift provided on the encoder side.

Phase shifters 21, 22, 23 and 24 on the decoder side are provided for the purpose of cancelling the phase shift provided by the phase shifters on the encoder side. Although it is ideal to shift back the phase by the same electrical degrees the angles of phase shifts $\theta$ and 3$\theta$ on the decoder side may be 0° and 90°, respectively.

Figure 9:
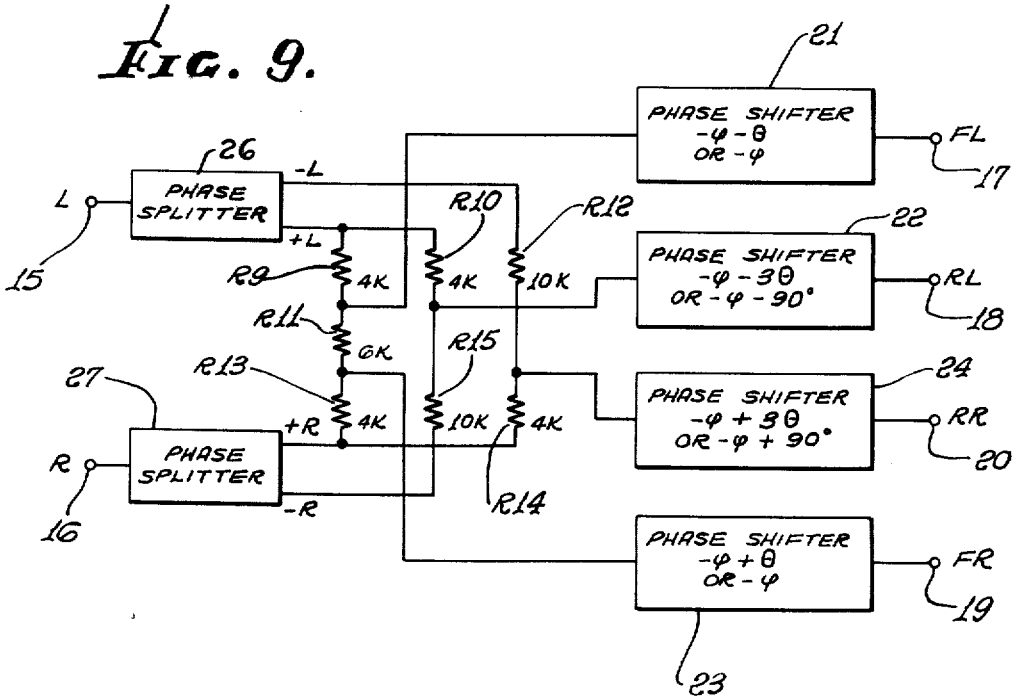
FIG. 9 shows a connection diagram of a modified decoder.

In a modified decoder shown in FIG. 9, there are provided phase splitters 26 and 27 and a resistance network including resistors $R_9$ and $R_{15}$ inclusive.

Although the invention has been shown and described in terms of some preferred embodiments thereof, it will be clear that many changes and modifications will be obvious to one skilled in the art without departing from the true spirit and scope of the invention as defined in the appended claims. Thus, for example, although the invention is particularly suitable as an encoding system of two channel systems used for manufacturing matrix four channel stereophono disc, this system can also be used in a two channel transmission system for application other than two channel stereophono discs, such as an FM stereo broadcasting system, a wired broadcasting system or two track stereo tape recorder system.

What is claimed is:

1. An encoder system for producing two channel signals suitable for recording on a phono disc from first to fourth directional audio input signals, said encoder system comprising:

first to fourth input terminals for receiving said first to fourth audio input signals, respectively;

first and second output terminals from which said two channel signals are derived, respectively;

first to fourth phase shifter means coupled to said first to fourth input terminals, respectively, said first to fourth phase shifter means being operative to introduce relative phase differences of about +22.5°, +67.5°, −22.5° and −67.5° between said first to fourth audio input signals;

means connected in circuit with said first phase shifter means for coupling about 0.92 of said first audio input signal to said first output terminal;

means connected in circuit with said first phase shifter means for coupling about 0.38 of said first audio input signal to said second output terminal;

means connected in circuit with said second phase shifter means for coupling about 0.92 of said second audio input signal to said first output terminal;

means connected in circuit with said second phase shifter means for coupling about −0.38 of said second audio input signal to said second output terminal;

means connected in circuit with said third phase shifter means for coupling about 0.38 of said third audio input signal to said first output terminal;

means connected in circuit with said third phase shifter means for coupling about 0.92 of said third audio input signal to said second output terminal;

means connected in circuit with said fourth phase shifter means for coupling about −0.38 of said fourth audio input signal to said first output terminal; and means connected in circuit with said fourth phase shifter means for coupling about 0.92 of said fourth audio input signal to said second output terminal.

2. [ A decoder for producing first to fourth output signals from first and second channel signals each including four audio signals having predetermined relative amplitude ratios and relative phase differences of about +22.5°, +67.5°, −22.5° and −67.5° therebetween, said decoder comprising: ] *A decoder for producing first to fourth output signals from first and second channel signals each including at least first, second, third and fourth audio input signals in preselected amplitude and phase-shifting relationships; the amplitude relationship being such that the amplitude ratios of said first and second audio input signals contained in said first channel signal to said first and second audio input signals respectively contained in said second channel signal are substantially 0.9:0.38, and the amplitude ratios of said third and fourth audio input signals contained in said second channel signal to said third and fourth audio input signals respectively contained in said first channel signal are substantially 0.92:0.38, and the phase-shifting relationship being such that, for said first to fourth audio input signals having the same frequency and phase, in each of said first and second channel signals there is a phase difference of substantially 45° between said first and third audio input signals, in said first channel signal said first and third audio input signals lag from said fourth and second audio input signals respectively by substantially 90°, in said second channel signal said first and third audio input signals lead said fourth and second audio input signals respectively by substantially 90°, and said first and third audio input signals in said first channel signal are substantially in phase with said first and third audio input signals in said second channel signal, respectively, and said second and fourth audio input signals in said first channel signal are substantially 180° out of phase with said second and fourth audio input signals in said second channel signal, respectively, said decoder comprising:* first and second input terminals for receiving said first and second channel signals, respectively;

first to fourth output terminals from which said four output signals are derived, respectively;

first to fourth phase shifter means coupled to said first to fourth output terminals, respectively;

means connected to said first input terminal for coupling about 0.92 of said first channel signal to said first phase shifter means;

means connected to said first input terminal for coupling about 0.92 of said first channel signal to said second phase shifter means;

means connected to said first input terminal for coupling about 0.38 of said first channel signal to said third phase shifter means;

means connected to said first input terminal for coupling about −0.38 of said first channel signal to said fourth phase shifter means;

means connected to said second input terminal for coupling about 0.38 of said second channel signal to said first phase shifter means;

means connected to said second input terminal for coupling about −0.38 of said second channel signal to said second phase shifter means;

means connected to said second input terminal for coupling about 0.92 of said second channel signal to said third phase shifter means; and means connected to said second input terminal for coupling about 0.92 of said second channel signal to said fourth phase shifter means.

3. A decoder according to claim 2 wherein said first to fourth phase shifter means are operative to introduce between input signals thereto relative phase differences of about −22.5°, −67.5°, +22.5° and +67.5°.

4. A decoder according to claim 2 wherein said first to fourth phase shifter means are operative to introduce between input signals thereto relative phase differences of about 0°, −90°, 0° and 90°.

*5. An encoding apparatus for encoding at least first, second, third and fourth audio input signals into first and second channel signals, said first and second channel signals being capable of being decoded, at the reproduction side, into at least first, second, third and fourth audio output signals respectively which in use are coupled to at least first, second, third and fourth loudspeakers arranged around a listener, said encoding apparatus comprising:*

*signal combining network means for producing said first and second channel signals by combining said first, second, third and fourth audio input signals in preselected amplitude and phase relationships,*

*with said phase relationships such that, for input signals having the same frequency and phase, in each of said first and second channel signals said first audio input signal leads said third audio input signal by substantially 45°, in said first channel signal said first and third audio input signals lag said fourth and second audio input signals respectively by substantially 90°, and in said second channel signal said first and third audio input signals lead said fourth and second audio input signals respectively by substantially 90°, and*

*with the amplitude ratios of said first and second audio input signals contained in said first channel signal to said first and second audio input signals respectively contained in said second channel signal being substantially 0.92:0.38, and with the amplitude ratios of said third and fourth audio input signals contained in said second channel signal to said third and fourth audio input signals respectively contained in said first channel signal being substantially 0.92:0.38, and*

*with said first and third audio input signals in said first channel signal substantially in phase with said first and third audio input signals in said second channel signal, respectively, and with said second and fourth audio input signals in said first channel signal substantially 180° out of phase with said second and fourth audio input signals in said second channel signal, respectively.*

*6. An encoding method for encoding at least first, second, third and fourth audio input signals into first and second channel signals comprising the steps of varying the amplitudes of the input signals, phase shifting the phases of input signals, and mixing the input signals,*

*the amplitude relationships being such that said first and second audio input signals contained in said first channel signal are larger in amplitude than those contained in said second channel signal, respectively, and said third and fourth audio input signals contained in said second channel signal are larger in amplitude than those contained in said first channel signal respectively, and*

*the phase-shifting relationships being such that, where said first to fourth audio input signals are assumed to have the same frequency and phase, in each of said first and second channel signals said first audio input signal leads said third audio input signal by substantially 45°, in said first channel signal said first and third audio input signals lag from said fourth and second audio input signals by substantially 90°, respectively, and in said second channel signal said first and third audio input signals lead said fourth and second audio input signals by substantially 90°, respectively, and*

*said first and third audio input signals in said first channel signal are substantially in phase with said first and third audio input signals in said second audio channel signals, respectively, and said second and fourth audio input signals in said first channel signal are substantially 180° out of phase with said second and fourth audio input signals in said second channel signal, respectively.*

*7. An encoding method according to claim 6 wherein the amplitude ratios of said first and second audio input signals contained in said first channel signal respectively to said first and second audio input signals contained in said second channel signal are substantially 0.92:0.38, and the amplitude ratios of said third and fourth audio input signals contained in said second channel signal respectively to said third and fourth audio input signals contained in said first channel signal are substantially 0.92:0.38.*

* * * * *